United States Patent [19]

Folchi et al.

[11] 4,001,556
[45] Jan. 4, 1977

[54] COMPUTER CONTROLLED PNEUMATIC RETRACTABLE SEARCH SENSOR

[75] Inventors: George A. Folchi, Yorktown Heights; Sherman S. Wang, Mohegan Lake, both of N.Y.; Peter M. Will, Norwalk, Conn.; Moshe M. Zloof, White Plains, N.Y.

[73] Assignee: International Business Machines Corporation, Armonk, N.Y.

[22] Filed: Apr. 7, 1975

[21] Appl. No.: 565,930

[52] U.S. Cl. .......................... 235/151; 235/151.11; 214/1 CM
[51] Int. Cl.² ...................... B25J 9/00; G06F 15/46
[58] Field of Search ...................... 235/151, 151.11; 214/1 CM; 33/1 K, 1 M, 1 BB

[56] References Cited

UNITED STATES PATENTS

| | | | |
|---|---|---|---|
| 3,168,203 | 2/1965 | Gallistel | 214/1 CM |
| 3,550,630 | 12/1970 | Panissidi | 235/151.11 UX |
| 3,770,140 | 11/1973 | Dukette | 214/1 CM X |
| 3,878,652 | 4/1975 | Mosher | 214/1 CM X |

OTHER PUBLICATIONS

Ignatyev et al., "Underwater Manipulator with Automatic Electronic Computer Control", Oceanology, vol. 11, No. 3, (1971), pp. 420–425.

*Primary Examiner*—Joseph F. Ruggiero
*Attorney, Agent, or Firm*—Philip Young

[57] ABSTRACT

A mechanical manipulator which includes fingers under the control of a computer, antenna sensing means mounted on such fingers and extended and retracted from the fingers under the control of the computer, means for detecting the contact or proximity of the extended antenna sensing means with a workpiece, means responsive to the antenna sensing means for retracting the sensing means from interference with the workpiece and for adjusting the control of the fingers. The fingers are adapted for X, Y and Z linear motions and provides pitch, yaw and roll angular motion. The retractable antenna sensing means resembles a whisker which extends from the finger and makes contact with or approaches the workpiece. The antenna sensing means may include a retractable pneumatic back pressure sensor via the back pressure of a fluid in the supply, created when the fluid impinges on the workpiece. The retractable antenna whisker bends more readily than the rigid finger. Therefore, contact with an object will not cause displacement of the object as a rigid finger would. Computer logic circuits receive signals representing the displacement and positions of both the antenna sensing means as well as the manipulator fingers and coordinates both sets of signals to determine the orientation and position of the workpiece and the shape of the workpiece.

11 Claims, 6 Drawing Figures

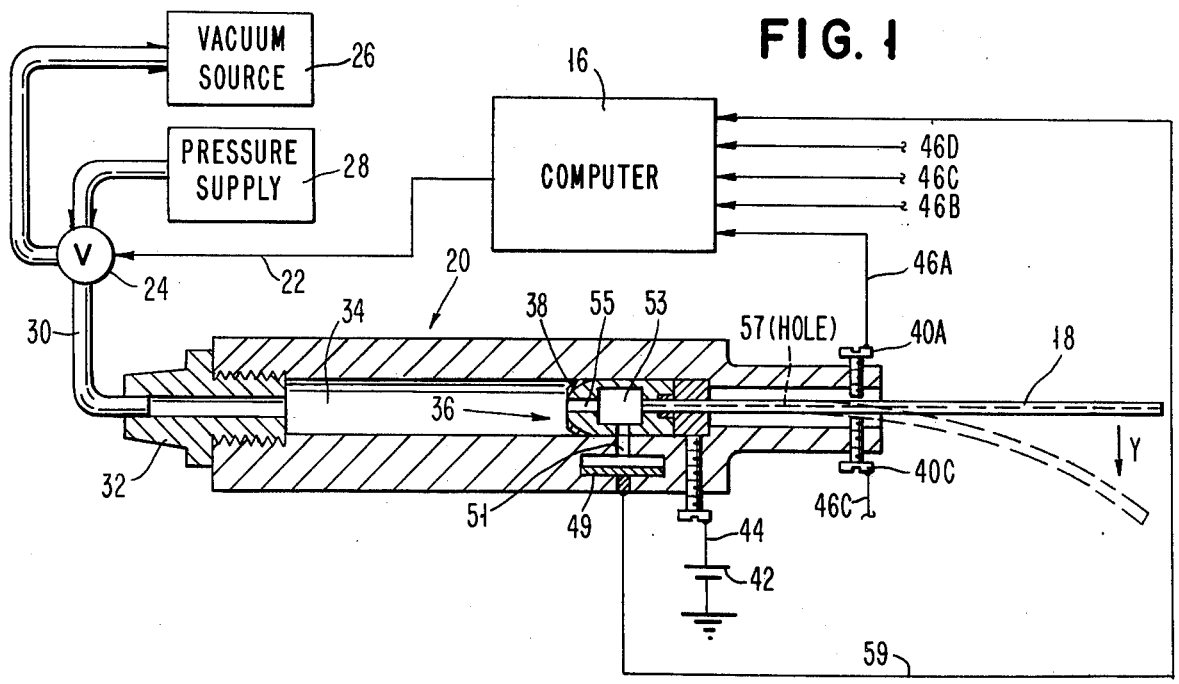
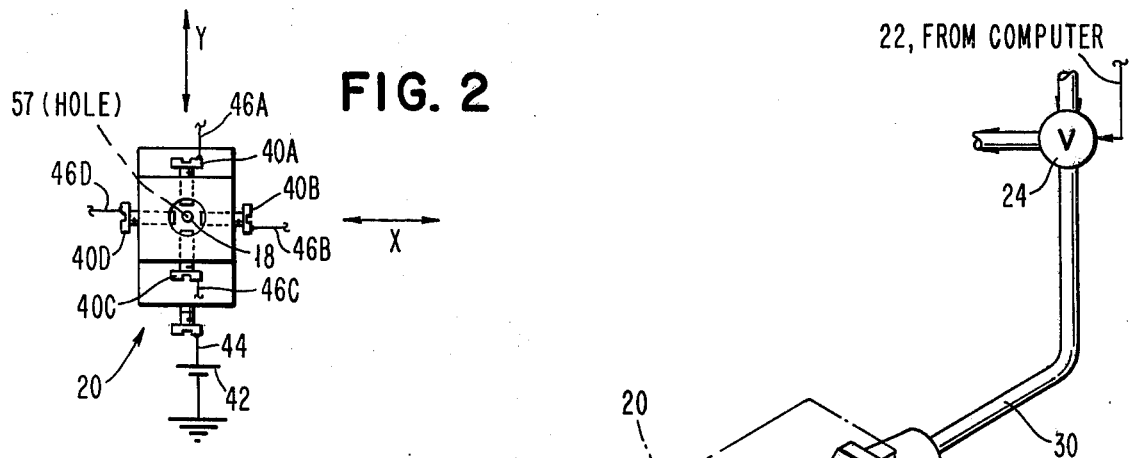
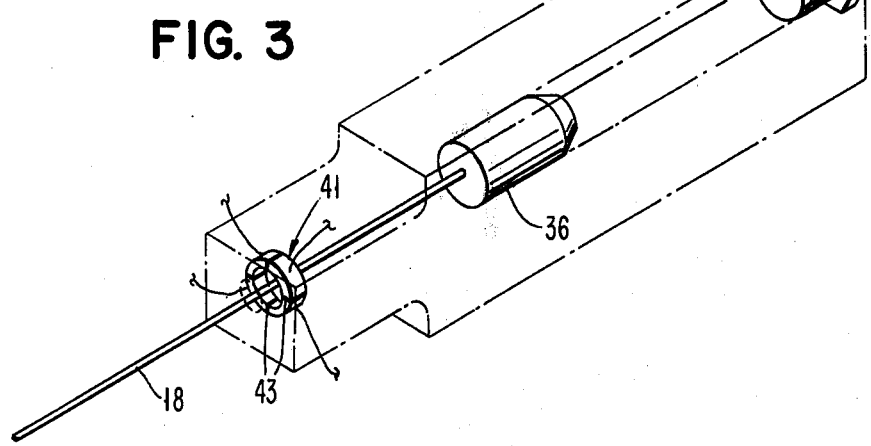

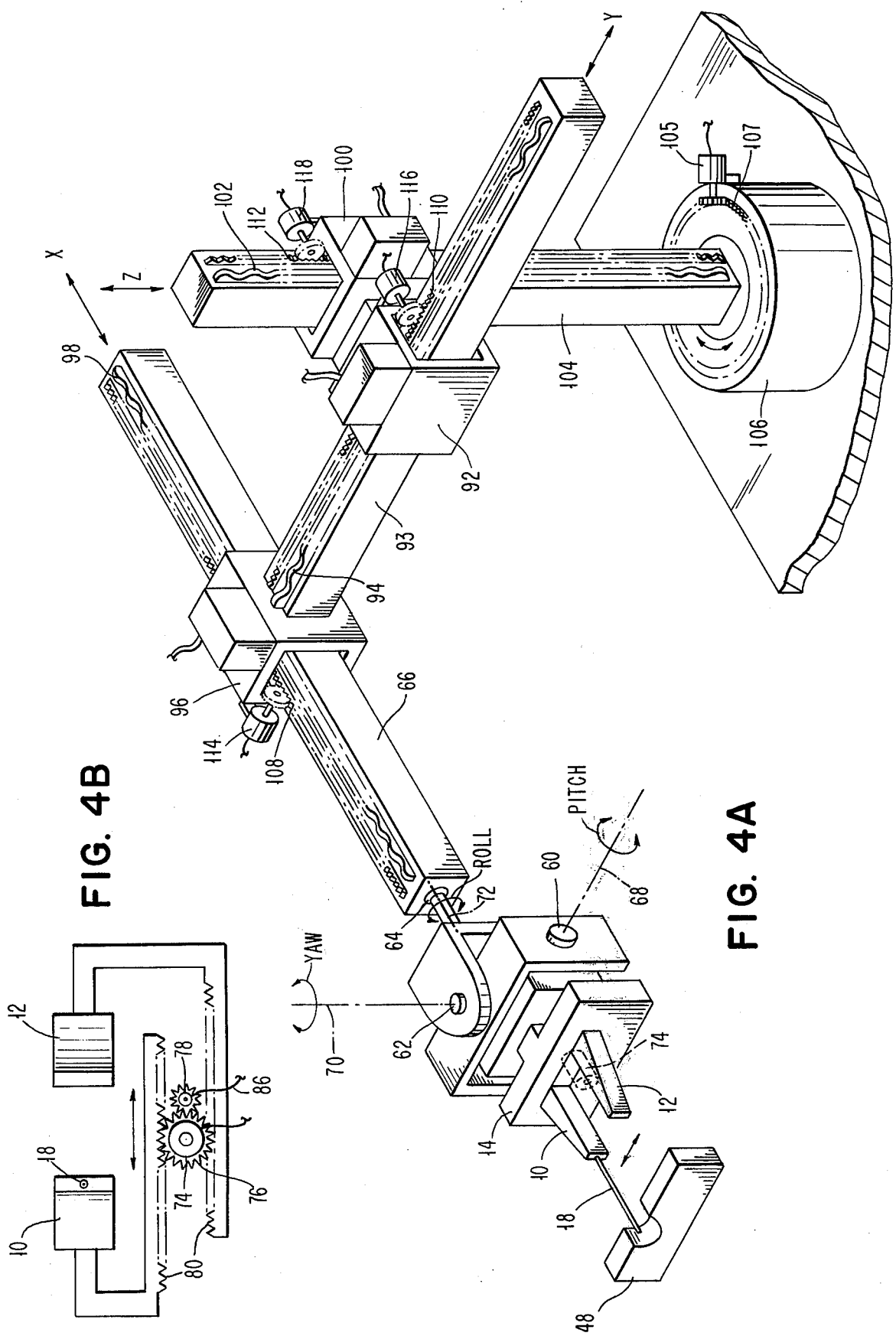

COMPUTER CONTROLLED PNEUMATIC RETRACTABLE SEARCH SENSOR

BACKGROUND OF THE INVENTION

1. Field of the Invention

The present invention relates to manipulator systems, and more particularly to computer controlled manipulators for performing assembly work.

2. Description of the Prior Art

In recent years, there have been proposed industrial manipulators equipped with tactile sensors to determine the position of the workpiece. In using a manipulator system to perform assembly work, generally, a large variety of assembly processes are involved. Therefore, a simple, yet flexible method to determine parts position and orientation by the manipulator system is required. Visual systems have been proposed. However, the industrial manipulator system may be located in a very hazardous environment, such as in smoke, steam, and dust. It also may be possible that many of the components to be assembled by the manipulator system may be of such a shape tht a visual system will not detect the profile of the object. Also, a visual system is limited to line of sight detection of an object.

In an article "Tactile Perception for Robot Devices," by M. H. E. Larcombe, in the First Conference on Industrial Robot Technology, University of Nottingham, U.S., Mar. 27-29th, 1973, pp.R16-191-195, a robot using tactile perception is described. On a movable robot on wheels is mounted a pincer style manipulator, which is covered by a tactile sensing surface. The requirement for a finger-like probe is suggested which would be articulated to allow feature tracing and some form of cylindrical or ellipsoidal sensing surface which may be rolled over features.

One problem associated with proposed manipulator devices is that the manipulator hand or fingers cannot be finely controlled in their movements near the workpiece just prior to making contact with the workpiece, often resulting in unintentional knocking over or displacement of the workpiece. One possible approach is to use the known proximity sensors available generally for detecting the presence of an object in their proximity. Here, however, the sensitivity of such sensors would require the manipulator to be very close to the objects for sensing and might not prevent the manipulator from bumping into objects. Also, if such proximity sensors were used with the fingers, they might physically interfere with the finger operation.

SUMMARY OF THE INVENTION

Therefore, it is an object of the present invention to provide a computer controlled manipulator which provides close-up sensing of objects without interfering with the position and orientation of such objects. It is another object to provide a manipulator with sensing means that permit close-up sensing of objects located in hazardous environments, such as smoke, steam and dust. It is another object to provide a mechanical manipulator which maintains surveillance of the orientation and position of objects, including sensing of objects or workpieces in small, difficult to reach areas, such as around corners and inside of cavities. It is a further object to provide a means to detect an object which is inclined at any odd angle.

These and other objects are achieved by the present invention which provides a mechanical manipulator which includes fingers which follow a computer controlled movement, antenna sensing means which are extended and retracted under the control of the computer, means for detecting the contact or proximity of the extended antenna sensing means with a workpiece, means responsive to said antenna sensing means for retracting said sensing means from interference with the workpiece and for adjusting the control of the fingers. The fingers are adapted for X, Y and Z linear motions and provides pitch, yaw and roll angular motion. The retractable antenna sensing means resembles a whisker which extends from the finger to make contact with or approach the workpiece. Contact switches provide multi-direction detection of the workpiece by the antenna sensing means. The antenna sensing means may include a pneumatic back pressure sensor for non-contact sensing via the back pressure of a fluid in the supply, created when the fluid impinges on the workpiece. Computer logic circuits receive signals representing the displacement and positions of both the antenna sensing means as well as the manipulator hand and fingers and coordinates the sets of signals to determine the orientation and position of the workpiece and the shape of the workpiece.

BRIEF DESCRIPTION OF THE DRAWINGS

FIG. 1 is a cross-sectional view of the retractable sensor connected in the computer controlled manipulator system, illustrative of the present invention;

FIG. 2 is a side view of a multi-contact screw arrangement around the whisker antenna;

FIG. 3 is a perspective view of an alternate multi-contact ring arrangement around the whisker antenna;

FIG. 4A is a perspective view of the manipulator, with the sensor antenna in the extended, operative position, and shows the mechanical means for positioning and orienting the manipulator hand and fingers, and for sensing their positions;

FIG. 4B shows the means for positioning the fingers and for sensing their positions.

DETAILED DESCRIPTION OF THE PREFERRED EMBODIMENTS

Figure 5:
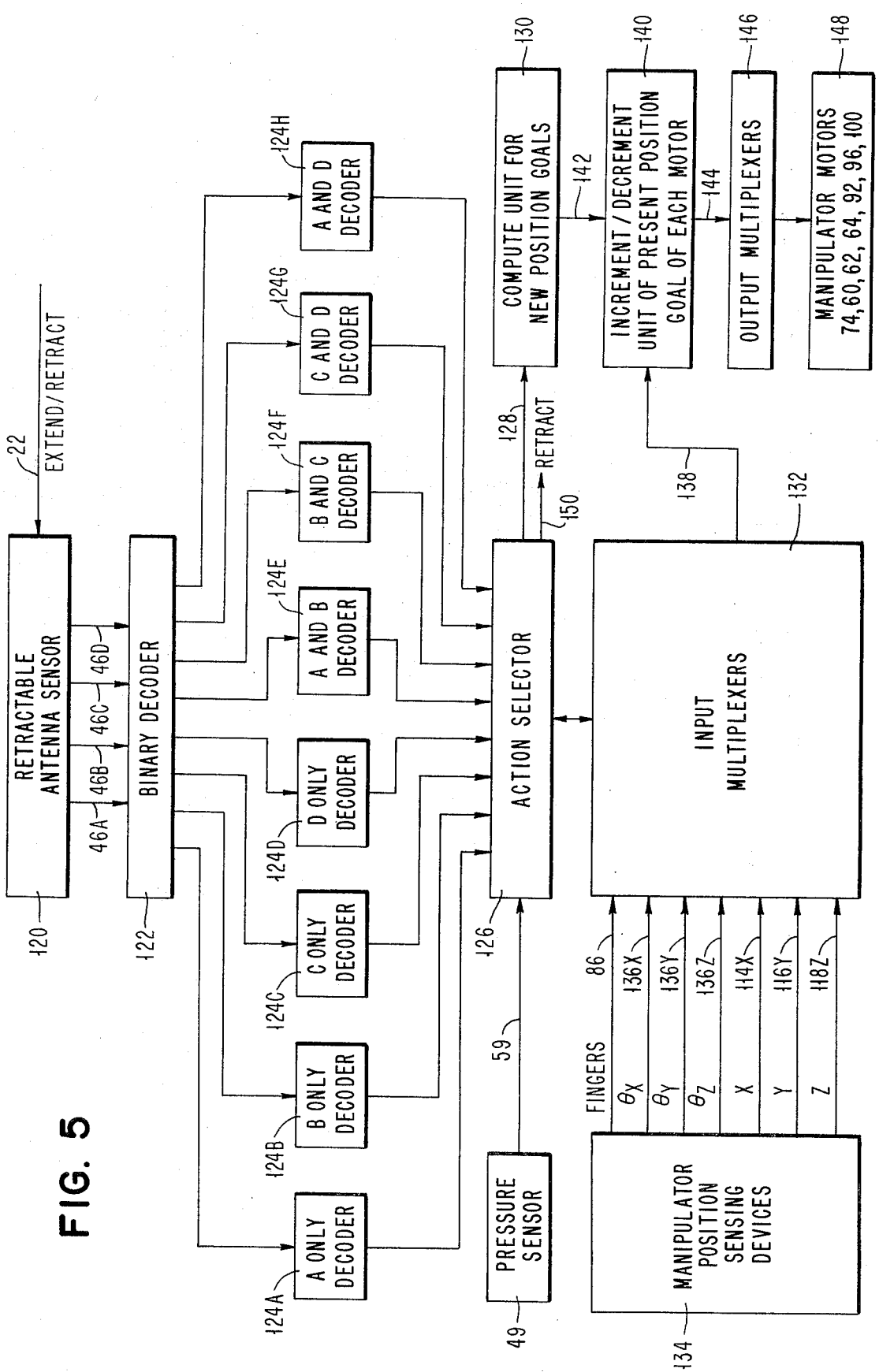
FIG. 5 is a functional block diagram of the circuits in the computer used to coordinate the manipulator arm and finger motions with the output of the transducer system.

Referring to FIG. 1, there is shown a cross-sectional view of the transducer connected in the computer controlled manipulator system in accordance with the present invention. The transducer is mounted within one of the manipulator fingers 10 and 12, shown in FIGS. 4A and 4B. Within or on the fingers 10 and 12 there is mounted the antenna sensing means comprising an antenna 18 in the form of a whisker which is mounted in a cylinder 20 and protrudes from the front end of the body of such cylinder 20. The computer 16 is electrically connected via line 22 to a control valve 24 which connects both a vacuum source 26 and a pressure supply 28 to a fluid line 30 for respectively decreasing or increasing the pressure in the fluid line 30. The fluid line 30 is connected to the back end 32 of the hollow cylinder 20 and in fluid communication with the hollow bore 34 of the cylinder 20 such that a piston 36 can be driven in the guide passage formed by the hollow bore 34. A fluid seal 38 is provided in an annular form so as to provide a seal between the cylinder 20 and the piston 36. Thus, the computer 16 provides signals for opening the control valve 24 and pressure supply 28 to drive the piston 36 and, also, the whisker antenna 18 forward into its extended, operating position.

Sensing means for the whisker antenna comprise four adjustable contact screws 40A, B, C, D shown in more detail in FIG. 2 and arranged at 90° intervals around the whisker antenna 18. A voltage supply source 42, such as a 5 volt d.c. source, is electrically connected via line 44 to the antenna whisker 18. Each of the screws 40A, B, C, D is individually connected to respective separate lines 46A, B, C and D, which in turn are connected to logic circuits in the computer 16 to provide X and Y axis contact sensing as will be described in more detail hereinafter. When the whisker antenna 118 touches any foreign object, for example the object 48 shown in FIG. 4A, such whisker antenna 18 will be deformed and make contact with one of the four adjustable screws 40A, B, C, D. At this time, the whisker antenna 18 will provide a signal to the computer system 16 via one of two of the lines 46A, B, C or D according to the contact made by the whisker antenna 18. In turn, the computer 16 determines the position and location of the object 48 by the contact with whisker antenna 18 and the position transducer measured by the X-Y-Z, pitch, yaw and roll motors, to be described. The spacing between the screws 40A, B, C, D can be adjusted to increase or decrease the sensitivity of the whisker antenna 18. In this fashion, the four screws provide a directional sensing in the X and Y directions by the whisker antenna 18.

Referring again to FIG. 2, it is to be noted that more than or less than the four screws 40A, B, C, D can be employed. For example, eight screws could be employed to give angular resolution or discrimination in the deflections of the antenna whisker 18. Alternately, instead of the use of the contact screws 40A, B, C, D, a segmented contact ring 41, as shown in FIG. 3, may be employed having a plurality of separate contact segments on the ring which are separated and insulated from each other by insulators 43. Each of the contact segments on ring 41 is connected to individual wires, such as the lines 46A, B, C and D shown in FIG. 1. In such arrangement, contact of the whisker antenna 18 with any of the segments will provide a signal on the contacted sensor line to the computer 16 for deriving positional information of the workpiece contacted.

In addition, in applications where non-contact sensing of the whisker antenna 18 is required, a semiconductor miniature pressure sensor 49 is mounted on the cylinder 20 with an opening 51 in fluid communication with a chamber 53 of piston 36, as shown in FIG. 1. Chamber 53 communicates with a flow restriction passage 55 in the piston 36, and also communicates with a passage 57 extending through the antenna 18. The fluid from pressure supply 28 flows through valve 24, line 30, cylinder passage 34, piston passage 55, chamber 53 and antenna opening 57, and out the end of the antenna 18. If an object is sufficiently close to the end of antenna 18, a back flow pressure is created which is detected by the pressure sensor 49. Sensor 49 responds to the detected pressure buildup by providing a signal on line 59 to the computer 16 for generating appropriate position signals. As an example, the pressure sensor 49 responds to an increase in the back pressure when an object is located approximately within 1/16 inches from the tip of antenna 18. An analog voltage output of the pressure sensor 49 can be used to measure the distance between the tip of the antenna 18 and the foreign object. This output may also be used as a feedback signal on line 59 to the computer such that the manipulator can trace the outside surface of a three dimensional object without touching it. In one embodiment, the outside diameter of the antenna 18 is about 0.040 inches and, therefore, the system can detect a hole less than 0.050 inches. After detection, the antenna 18 is retracted by a signal from computer 16 which opens the control valve 24 for the vacuum source 26. When the pneumatic sensor is retracted, the fingers 10, 12 can perform heavy duty work without concern about damage to the whisker antenna 18.

Referring to FIG. 4A, there is shown a perspective view of the fingers 10 and 12 mounted on a finger driver block 14 of the manipulator hand. The manipulator fingers 10 and 12 follow a computer controlled movement via motor operated gimbal and arm mechanisms which are connected to a computer 16 which produces signals for moving the hand and fingers 10 and 12 in one or more combined X, Y and Z linear motions, and in pitch, yaw and roll angular motions. The finger driver block 14 is operatively connected to a pitch motor 60, a roll motor 62 and a yaw motor 64, which in turn are connected to an arm 66 of the manipulator device. Each of the motors 60, 62 and 64 respond to positional signals from the computer 24 for controlling the movements of the manipulator hand about the pitch axis 68, the yaw axis 70 and the roll axis 72. Fingers 10 and 12 have the capability to open and close and also have a relative motion with respect to the finger driver block 14. A motor 74 and associated gear means, shown in FIG. 4B, are connected on the block 14 for driving the fingers 10 and 12 toward or away from each other in response to position signals from computer 16. Given a specific position, fingers 10 and 12 can be locked into a rigid body firmly connected to the block 14.

As shown in FIG. 4B, the motor 74 is operatively connected by means of gears 76 to a pair of gear racks 80 for driving the fingers 10 and 12 either toward or away from each other in unison. Gear racks 80 move longitudinally to the left and right as shown by the arrows in FIG. 4B. A potentiometer 78 has its shaft teeth in operative engagement with motor gears 76 so that the motor shaft angular position is reflected in the output of the potentiometer 78 on line 86. This output on line 86 is therefore directly related to the separation of the fingers 10 and 12.

Referring again to FIG. 4A, the positioning mechanism for the manipulator hand and fingers also includes a Y-axis motor drive 92 which operatively drives a Y-axis track 94 on arm 93, an X-axis motor drive 96 which operatively drives an X-axis track 98 on arm 66, and a Z-axis motor drive 100 which drives a Z-axis track 102 on arm 104. The manipulator arm 66 contains the X-axis track 98. The Z-axis track 102 is mounted on upright arm 104 which is mounted at its lower end in a swivel base 106. If desired, a swivel motor in the base 106 is employed to change the pivot position of the entire arm assembly, and a swivel potentiometer 105 engages with a gear rack 107 to provide positional electric signals to the computer. Positional signals indicative of the displacements of the X, Y and Z arms by their respective motors 96, 92 and 100 are provided by potentiometer racks 108, 110 and 112 extending along each manipulator arm. Potentiometers 114, 116 and 118 are operatively mounted so that their shaft gears engage with respective potentiometer racks 108, 110 and 112. In operation, the longitudinal movements of the manipulator arms and their potentiometer racks change the angular position of the respective potentiometer shafts, thereby directly affecting its electrical output.

Referring to FIG. 5, there is shown a functional block diagram of the computer 16 used in connection with the various parts of the manipulator arm and fingers, and the sensing devices shown in FIGS. 1–4. More specifically, the retractable antenna sensor shown in FIG. 1 is indicated by the numeral 120 in FIG. 5 and receives the control signals on line 22 for extending or retracting the antenna sensor. When the whisker antenna 18 contacts an object, such antenna 18 makes contact with one contact screws 40A, B, C or D or a combination of these screws to provide signals on one or more of lines 46A, B, C and D. These contact signals are fed into the computer 16 to a binary decoder 122 which derives the logic for the eight possible contact variations shown by the blocks 124A through H. The blocks 124A through H may be considered as portions of the binary decoder 122. Each of the decoder portions 124A through H provides an output signal to an action selector 126 to indicate the position of contact of the retractable antenna sensor. More specifically, decoder 124A responds to contact with screw 40A and therefore a signal on line 46A to the computer, decoder 124B responds to a signal on line 46B only, decoder 124C responds to a signal on line 46C only, and decoder 124D responds to a signal on line 46D only. Also, decoder 124E responds to signals on both lines 46A and 46B, decoder 124F responds to signals on both lines 46B and 46C, decoder 124G responds to signals on both lines 46C and 46D, and decoder 124H responds to signals on both lines 46A and 46D. Action selector 126 also receives a signal on line 59 from the pressure sensor 49 when such sensor is employed in the system.

The action selector 126 is also connected to input multiplexers 132 which receive signals from the manipulator position sensing devices shown as block 134. These position sensing devices 134 include the potentiometers for the various movable portions of the manipulator, such as the finger potentiometer 78 providing an output signal on line 86, each of the potentiometers for the pitch, roll and yaw motors which provides signals indicated by lines 136X, 136Y and 136Z, and the signals from the potentiometers on lines 114X, 116Y and 118Z associated with each of the X, Y and Z manipulator arms and tracks shown in FIGS. 4A and 4C. The position signals from the potentiometers in block 134 are fed to the input multiplexers 132 for derivation of the resultant position of the fingers. It is noted that the input multiplexers 132 receive position sensing signals not only from the manipulator arms and the pitch, roll and yaw potentiometers, but also from both the finger potentiometer and the sensing devices for the retractable antenna 18.

The action selector 126 receives, as its input, digital lines indicating the state of each position sensing device 134 via the input multiplexers 132 and the retractable sensor 120 via lines 124A through 124H. Boolean logical combinations of these inputs are used to select an action to be executed from a list of actions previously stored in the action selector 126. Examples of stored actions are "stop", "freeze", "go to straight line", "rotate fingers", "search", "locate", "insert", etc. The action selector 126 receives all input signals and determines which actions to take depending on the stored action programs. The selected action is passed via line 128 to a position goal compute unit 130 which computes the specific coordinate conversion calculations required to execute the desired action. The output of the compute unit 130 passes on line 142 to an increment/decrement unit 140 which takes the present positions on lines 138 and appropriately increments or decrements them to achieve the goal positions set on line 142 from the compute unit 130. The output of the increment/decrement unit 140 passes on lines 144 to output multiplexers 146 which in turn drive the required one or more manipulator motors 60, 62, 64, 74, 92, 96 and 100 shown by the system block 148.

The action selector 126 to be used in the manipulator of the present invention can more specifically take the form of the measuring station program element 22 shown in U.S. Pat. No. 3,839,800 to Bederman et al wherein a measurement station control element 17 shown in FIGS. 12–17 operates in response to a selected one of many programs stored in the program element 22 and controls the appropriate motors to sweep a probe 66 relative to the workpiece along certain paths. Alternatively, by way of example, the action selector 126 of the present invention can take the form of the computer controlled manipulator programs shown in the block diagrams of FIGS. 3–5 of the publication Oceanography, Vol. 11, No. 3, 1971 at pages 420–425 by M. B. Ignat'yev et al., wherein the selection of various stored manipulator actions are based on the state of input sensors.

In one typical object search operation, the whisker antenna 18 is extended by a control signal on line 22 which opens the control valve 24 to the pressure supply 28 for driving the piston 36 into its extended position. The manipulator motors 148 shown by block 148 in FIG. 5 move the manipulator in accordance with the position goals generated in compute unit 130 and the increment/decrement signals provided by the increment/decrement unit 140. The manipulator hand and fingers is moved until the whisker antenna 18 detects the desired object. At this point, a signal on any one of lines 46A, B, C and D produces an output inhibit signal from one of lines 124A–124H which causes the action selector 126 to select a freeze action which then causes units 130 and 140 and the output multiplexers 146 to freeze all motor operations. After an appropriate delay, the action selector 126 issues a retract command on line 150 which subsequently produces the appropriate signal on line 22 to the control valve 24. When the whisker antenna 18 is retracted, the deactivated decoders 124A–124H provide signals to the action selector 126 which causes the particular motor(s) assigned to the direction sensed by the antenna 18 to operate in the reverse direction to move the fingers 10 and 12 backwards by some predetermined amount and clear the whisker antenna 18 from the object. This completes the action of moving until touch, then moving backwards to a convenient nearby position.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A mechanical manipulator comprising fingers for grasping a workpiece, an extendible sensing device on said fingers which includes a long, thin whisker antenna, means for extending said whisker antenna, means for detecting contact or proximity of said whisker antenna with said workpiece, means for withdrawing said whisker antenna from interference with said workpiece, means responsive to said detecting means to adjust the control movements of the manipulator fingers, and means for controlling extension and retraction of said whisker antenna.

2. A mechanical manipulator as recited in claim 1, wherein said extendible sensing device also includes contact means located adjacent said whisker antenna such that the deflection of said whisker antenna causes contact with said contact means and thereby produces an electrical detection signal.

3. A mechanical manipulator as recited in claim 2, wherein said contact means comprises a plurality of contact points located at spaced apart positions around said whisker antenna whereby deflection of said whisker antenna by predetermined amounts causes contact with said points.

4. A mechanical manipulator as recited in claim 2, wherein said contact means comprises a segmented contact ring encircling said whisker antenna whereby deflection of said whisker antenna by predetermined amounts causes contact with the segments of said ring and thereby produces said electrical detection signal through said contacted segments.

5. A mechanical manipulator as recited in claim 1, wherein said whisker antenna is mounted with its back end connected to a piston member of a pneumatic cylinder, said whisker antenna being extended by said piston to protrude from said fingers, and being retracted by said piston to a position within said fingers away from interference with the workpiece.

6. A mechanical manipulator as recited in claim 1, wherein said whisker antenna is adapted to be extended or retracted from said fingers, said whisker antenna having an outside surface made of an electrically conductive material, and contact means around said whisker antenna for making electrical contact with said whisker antenna when said whisker antenna is deflected by a workpiece.

7. A mechanical manipulator as recited in claim 1, wherein said sensing device includes: said whisker antenna having a longitudinal opening through its center for passage of a fluid therethrough, a piston connected at one end of said whisker antenna for extending and retracting said whisker antenna, said piston having a chamber formed therein for fluid communication at one end with said whisker antenna and with fluid communication at another end with a fluid supply, and fluid pressure sensor means connected in fluid communication with said chamber in said piston, whereby the increase of pressure in said chamber caused by the proximity of an object to the end of said whisker antenna produces an output from said fluid pressure sensor.

8. A mechanical manipulator as recited in claim 7, wherein said fluid pressure sensor comprises a semiconductor pressure sensor.

9. A mechanical manipulator as recited in claim 1, wherein said means responsive to said detecting means to adjust the control movements of the manipulator fingers comprises means for continuously sensing the position in space of said fingers, means for sensing the position of said whisker antenna when it detects contact or proximity with said workpiece, and logic means for combining the signals representative of the position of said fingers with the signals representative of the position of said whisker antenna for thereby adjusting the control movements of said manipulator fingers.

10. A mechanical manipulator as recited in claim 1, wherein said means for controlling extension and retraction of said whisker antenna in response to signals from said detecting means includes fluid pressure and vacuum supply means connected to valve means, and means responsive to the output signals from said detecting means for operating said control valve.

11. A mechanical manipulator comprising fingers for grasping a workpiece, an extendible sensing device on said fingers which includes a long, thin whisker antenna which is extendable into its operative position, contact means operated by said whisker antenna such that the deflection of said whisker antenna causes said contact means to produce an electrical detection signal, means for extending said whisker antenna, means for detecting contact or proximity of said whisker antenna with said workpiece, means for withdrawing said whisker antenna from interference with said workpiece, means responsive to said detection signal from said contact means to adjust the control movements of the manipulator fingers, and means for controlling extension and retraction of said sensor in response to said detection signals.

* * * * *